United States Patent
Bergeret et al.

(10) Patent No.: US 8,567,632 B2
(45) Date of Patent: Oct. 29, 2013

(54) COVER FOR A CULINARY ARTICLE WITH SILICONE GASKET

(75) Inventors: Nathalie Bergeret, Six-les-Bains (FR); Christophe Lorthioir, Bloye (FR); Pascal Cuillery, Faverges (FR)

(73) Assignee: SEB SA, Ecully (FR)

( * ) Notice: Subject to any disclaimer, the term of this patent is extended or adjusted under 35 U.S.C. 154(b) by 625 days.

(21) Appl. No.: 12/293,583

(22) PCT Filed: Mar. 23, 2007

(86) PCT No.: PCT/FR2007/000505
§ 371 (c)(1),
(2), (4) Date: Oct. 22, 2008

(87) PCT Pub. No.: WO2007/107656
PCT Pub. Date: Sep. 27, 2007

(65) Prior Publication Data
US 2010/0314394 A1 Dec. 16, 2010

(30) Foreign Application Priority Data
Mar. 23, 2006 (FR) .................... 06 02537

(51) Int. Cl.
*B65D 51/16* (2006.01)
(52) U.S. Cl.
USPC ......... 220/361; 220/367.1; 220/912; 220/913
(58) Field of Classification Search
USPC ........... 220/361, 805, 231, 366.1, 367.1, 912, 220/913, 785, 789, 790, 803, 360, 373, 374
See application file for complete search history.

(56) References Cited

U.S. PATENT DOCUMENTS

| | | | |
|---|---|---|---|
| 980,066 A | | 12/1910 | Collins |
| 1,953,585 A | * | 4/1934 | Brown ........................ 220/573.1 |
| 2,185,897 A | * | 1/1940 | Krause et al. ................. 210/244 |
| 4,258,694 A | * | 3/1981 | Kato ............................. 220/912 |
| 4,736,867 A | | 4/1988 | Feimer et al. |
| 5,587,192 A | * | 12/1996 | Beizermann .................. 426/118 |
| 5,613,618 A | * | 3/1997 | Raoult ........................... 220/369 |
| 5,653,881 A | * | 8/1997 | Bruss et al. ................... 210/467 |
| 5,730,045 A | * | 3/1998 | Delaquis et al. ................ 99/337 |
| 5,944,211 A | * | 8/1999 | Woodnorth et al. ....... 220/367.1 |
| 5,974,686 A | * | 11/1999 | Nomura et al. ................. 34/263 |
| 6,685,046 B2 | * | 2/2004 | Ogino ......................... 220/367.1 |
| 7,097,067 B2 | * | 8/2006 | Scarabelli et al. ............ 220/796 |
| 2008/0041852 A1 | * | 2/2008 | Cai ............................... 220/231 |

FOREIGN PATENT DOCUMENTS

| | | |
|---|---|---|
| EP | 1157648 A1 | 11/2001 |
| FR | 2789285 A1 | 8/2000 |
| GB | 2302263 A | 1/1997 |
| KR | 200121307 | 7/1998 |

OTHER PUBLICATIONS

International Search Report dated Sep. 5, 2007 from the corresponding priority PCT application.

* cited by examiner

*Primary Examiner* — Andrew Perreault
(74) *Attorney, Agent, or Firm* — Harness, Dickey & Pierce, PLC

(57) ABSTRACT

The invention relates to a cover for a culinary article comprising a lid designed to cover the culinary article and a silicone gasket running around the lid. According to the invention, in the radial direction, the gasket extends at least 10 mm, or ever 15 mm beyond the perimeter of the lid.

21 Claims, 7 Drawing Sheets

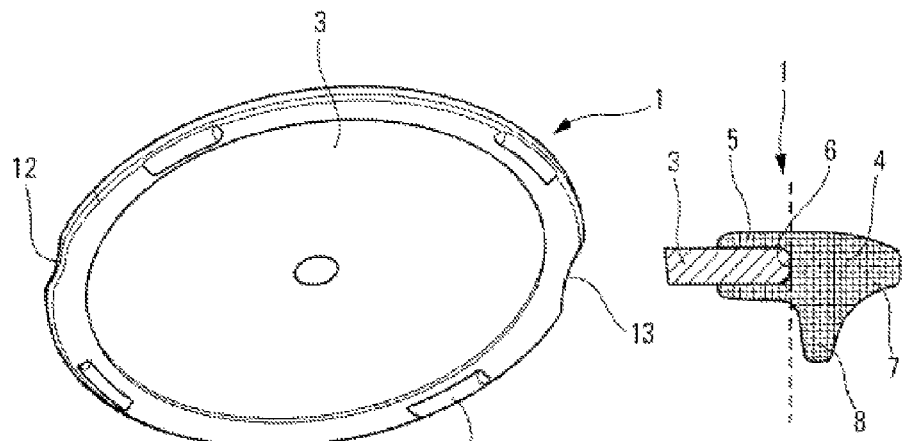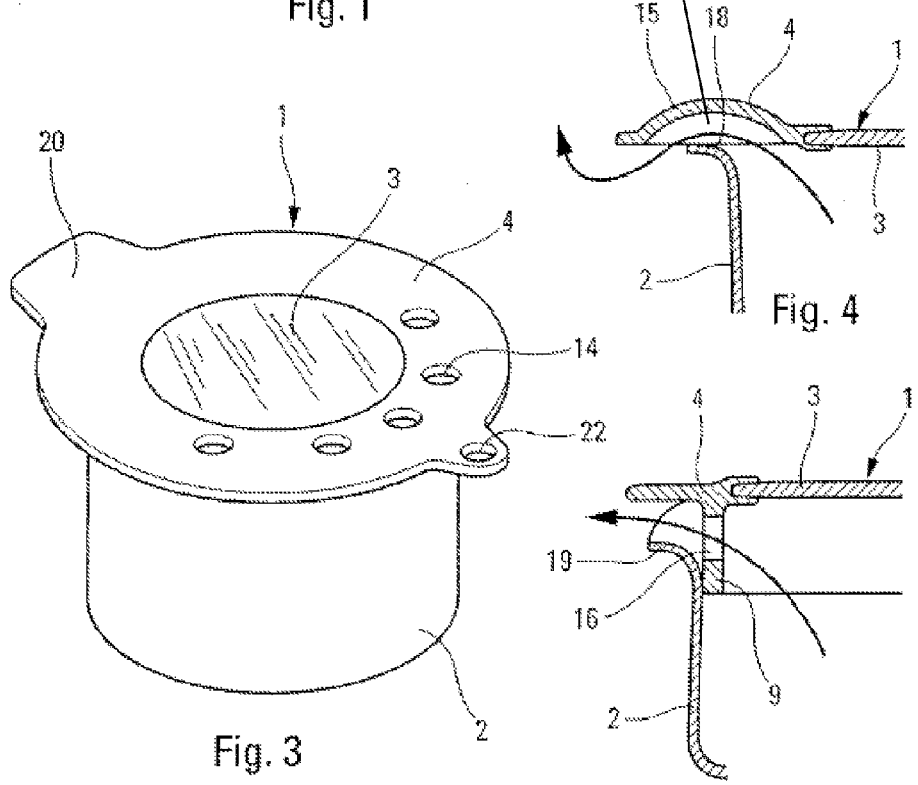

COVER FOR A CULINARY ARTICLE WITH SILICONE GASKET

FIELD

The present disclosure relates to a cover for a culinary article, for example a pan cover.

BACKGROUND

From Patent Application GB2302263, it is known a cover for a culinary article of the type comprising a lid designed to cover the culinary article and a silicone gasket running around the lid. In this document, the gasket is actually a seal of relatively constant width that only wraps along the perimeter of the lid.

SUMMARY

The object of the present invention is to provide a cover whose gasket enables new functionalities to be integrated in the cover, as well as in the gasket.

According to the invention, in the radial direction, the gasket extends at least 10 mm, or even 16 mm beyond the perimeter of the lid.

Because its own surface is so large, it is therefore possible to provide therein openings for the steam or any equipment to pass, without changing the lid of the cover.

DRAWINGS

Further features and advantages will become clearer from the description of the six non limiting exemplary embodiments illustrated in the drawings in which:

FIG. 1 is a perspective bottom of a cover (without a gripping member) according to a first embodiment of the invention;

FIG. 2 is a cross sectional view of the radial end of the cover illustrated in FIG. 1;

FIG. 3 is a perspective schematic view of a cover according to a second embodiment of the present invention, with the cover resting onto a culinary article;

FIG. 4 is a cross sectional schematic view of the radial end of a cover according to a third embodiment of the present invention, with the cover resting on a culinary article;

FIG. 5 is a view such as FIG. 4, with the cover being in accordance with a fourth embodiment of the present invention.

DETAILED DESCRIPTION

Figure 6:
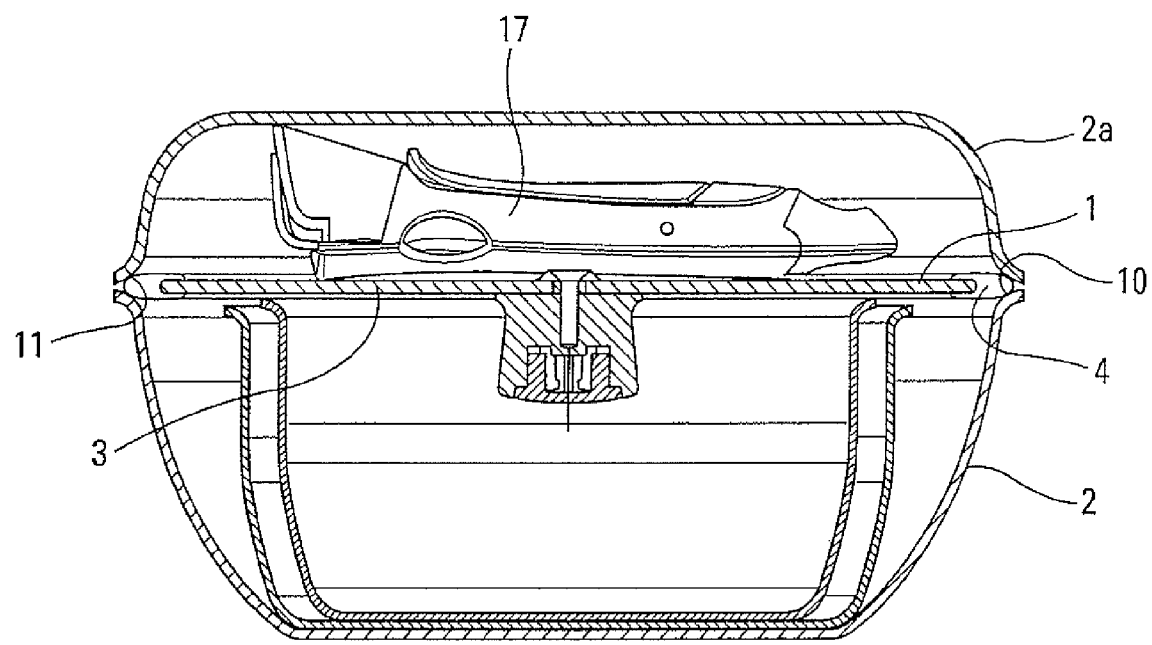
FIG. 6 is a cross sectional view of a set of culinary utensils comprising a cover according to a fifth embodiment of the present invention.

As it can be seen in FIGS. 1 to 9, a cover 1 for a culinary article 2 comprises, on the one hand, a lid 3 (for example made of glass) that forms the major part of the cover 1 and that is designed to cover the culinary article 2 and, on the other hand, a gasket 4 that runs along the lid 3. In the present invention, the gasket 4 is made of silicone and during an overmoulding operation of the lid 3. As indicated in FIG. 2, the gasket 4 comprises, in the radial direction, two portions: a covering portion 5 in which it covers a part of the lid 3 (the covering portion 5 radially extends to the perimeter 6 of the lid 3) and an extending portion 7 that does not cover any part of the lid 3 (the extending portion 7 is disposed beyond the perimeter 6 of the lid 3).

According to the present invention, in the radial direction, the gasket 4 extends at least 10 mm, or even 15 mm beyond the perimeter 6 of the lid 3, that is, on most of its perimeter (from the angular point of view), the extending portion 7 has a dimension in the radial direction at least equal to 10 mm, or even 15 mm.

On the other hand, the gasket 4 comprises centring means 8, 9, 10, 11 enabling the cover 1 to be centred on the culinary article 2.

In the embodiments illustrated in FIGS. 1, 2, 5 and 8, these centring means 8, 9 are formed by falling walls 8, 9. More precisely, in the embodiment of FIGS. 1 and 2, the centring means 8 are formed by (in this case four) centring studs 8 that are distributed on the perimeter of the gasket 4 and that extend only on small angular sectors. In the embodiment illustrated on FIGS. 5 and 8, the centring means 9 are formed by an annular wall 9 that extends throughout the perimeter of the gasket 4.

In the embodiments illustrated in FIGS. 2 and 5, the falling walls 8, 9, in the radial direction, extend beyond the perimeter 6 of the lid 3: they are at least partly (here wholly) carried by the extending portion 7. In the embodiment illustrated in FIG. 8, the falling wall 9, in the radial direction, extends in front of the lid 3: they are at least partly (here wholly) carried by the covering portion 5.

The embodiment of FIG. 6 illustrates centring means 10, 11 that are formed, not by falling walls, but by the perimeter of the gasket 4. Moreover, in this embodiment, the gasket 4 comprises centring means 10, 11 on both sides of the cover 1, which enables two culinary articles 2, 2a whose peripheral rims have dimensions corresponding to the centring means 10, 11 of both sides of the cover (in the present embodiment, the centring means 10, 11 of both sides are identical) to be stored face-to-face.

Because the extending portion 7 of the gasket 4 has a large dimension, it is possible for this latter to support the centring means 8, 9, 10, 11 and, as in the embodiments illustrated in FIGS. 1 to 5, openings 12, 13, 14, 15a, 16. In the embodiment illustrated in FIG. 1, the gasket 4 defines, on the one hand, a passage way 12 for a movable gripping equipment 17 (cf. FIG. 6) or a utensil such as a spatula and, on the other hand, a passage way 13 for the steam to be discharged. In this embodiment, both passage ways 12, 13 are openings 12, 13 defined by the circumference of the gasket 4: they are each formed by a clearance 12, 13 made in the gasket 4 (which causes the extending portion 7 in this angular portion of the gasket 4 to have a small dimension). For these passage ways 12, 13 to be useful, their clearance 12, 13 radially extends to the inside of the cover 1 to the extent that it projects from the centring means 8. In the embodiment illustrated in FIG. 3, the extending portion 7 of the gasket 4 (more precisely, the radial part of the extending portion 7 lying more inside than the centring means 8, so that the steam can be discharged from the culinary article 2) comprises steam discharging passage ways 14 (in this case five) formed by ports 14, namely openings whose perimeter is closed. In FIG. 4, the steam discharging passage way 15a is formed by a boss 15 locally made in the extending portion 7 of the gasket 4, at the upper end 18 of the lateral wall of the culinary article 2. In FIG. 5, the steam discharging passage way 16 is formed by a port 16 made in the falling wall 9 carried by the gasket 4 that is a centring means. This port 16 is formed in the upper part of the falling wall 9, in front of a spout 19 of the lateral wall of the culinary article 2. This particular cooperation of the falling wall, the port 16 and the spout 19 enables a use enabling the steam to be discharged as well as the food to be dripped away.

Figure 7:
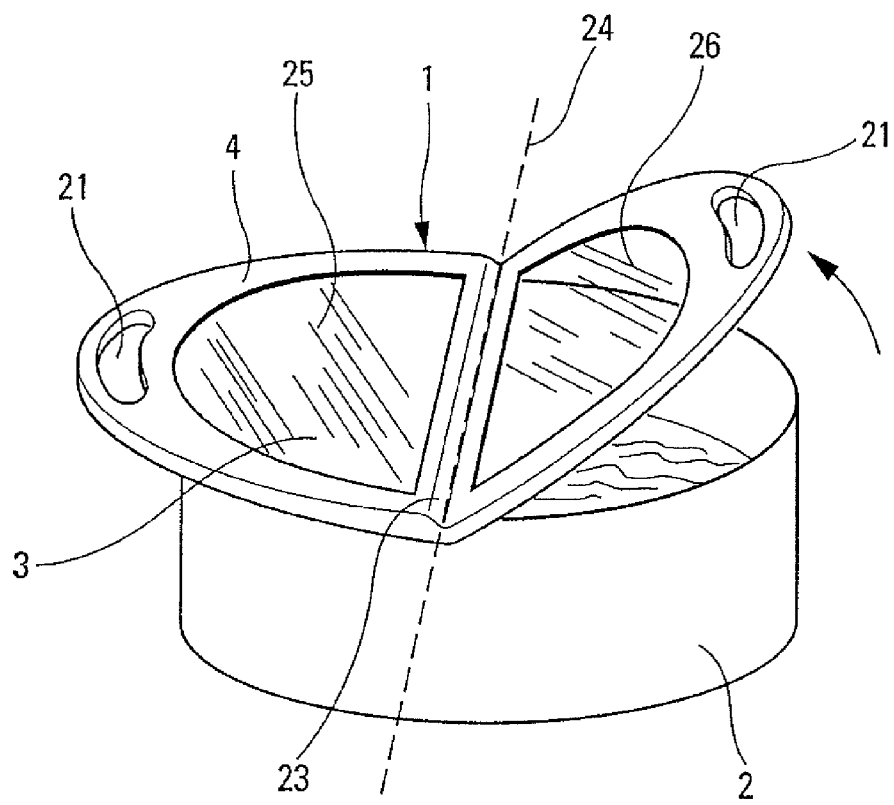
FIG. 7 is a perspective schematic view of a cover according to a sixth embodiment of the present invention, with the cover resting on a culinary article.

Another consequence of the radial direction of the extending portion is illustrated in FIGS. 3 and 7 where the gripping members 20, 21 of the cover 1 are carried by the gasket 4. Moreover, in these embodiments, the gripping members 20, 21 are made in the thickness of the gasket 4, which enables the thickness of the cover 1 to be dramatically reduced or the problem arising from its piling with other covers to be solved, or even to serve as a table mat. In the embodiment illustrated in FIG. 3, the gripping member 20 is formed by a tab 20 integral with the gasket 4 (single piece) and extending radially much beyond the culinary article 2 associated with the cover 1. In the embodiment illustrated in FIG. 7, the gripping member 21 (here, the cover 1 has two gripping members 21) is formed by a handle 21 also integral with the gasket 4 (single piece) and also radially extending much beyond the culinary article 2 associated with the cover 1.

Moreover, in the embodiment illustrated in FIG. 3, the gasket 4 carries a fastening opening 22 that is radially made beyond the culinary article 2 associated with the cover 1, and enabling the cover 1 to be fastened to a fastening device (for example a hook).

On the other hand, in the embodiment illustrated in FIG. 7, the lid 2 comprises a link 23 that defines a linking axis 24 and that axially extends, on both sides, to the gasket 4. The link 23 delineates with the gasket 4 two covering members 25, 26 of the lid 2 that thus form half-lids 25, 26. In this embodiment, the link 24 makes a single piece with the gasket 4 so that each covering member 25, 26 is surrounded by the part of the gasket 4 adjacent thereto and by the link 24, in a manner of a gasket 4, 24 that would be its own gasket. According to this embodiment, it is possible to bend the cover 1 during its use, for example to view the food being cooked or to stir it, without experiencing the drawbacks related to the removing of the cover 1 (drops of the condensate, hindrance of the hot cover 1 out of the culinary article 2). Because of the link 24, the cover 1 can be stored flat or bent, and because of the use of a gasket 4 carrying gripping handles 21 made in its thickness (one per covering member 25, 26), in the bending position, the hindrance is limited. In the present example, each covering member 25, 26 is of glass, but each of them could be of a different material (for example one of glass, the other of stainless steel).

Figure 8:
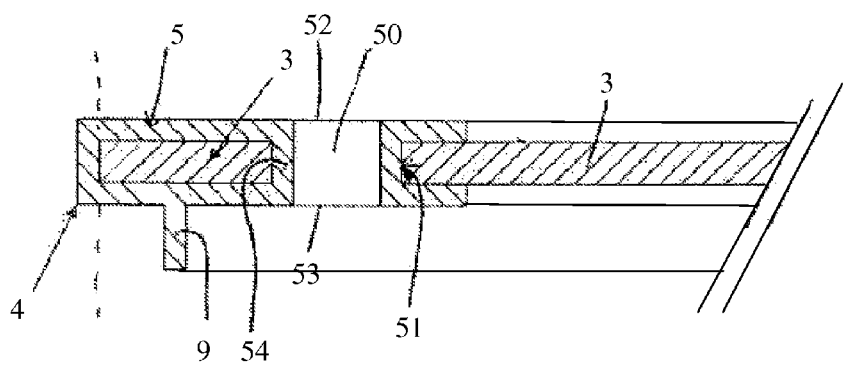
FIG. 8 is a view such as FIG. 5, with the cover being in accordance with a seventh embodiment of the present invention.
Figure 10:
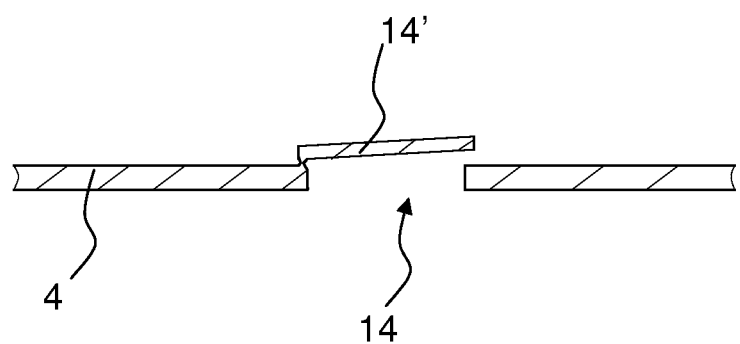
FIG. 10 is a cross sectional schematic view of gasket having a flexible flap according to an embodiment of the present invention.
Figure 11:
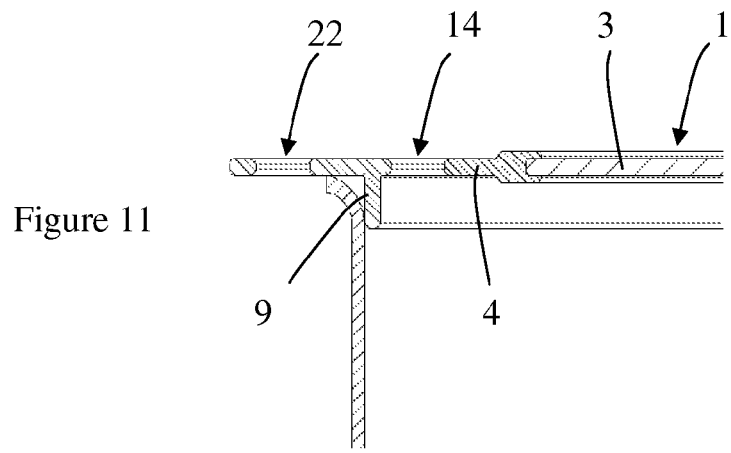
FIG. 11 is a cross sectional schematic view of the radial end of the cover according to the embodiment of FIG. 3.
Figure 12:
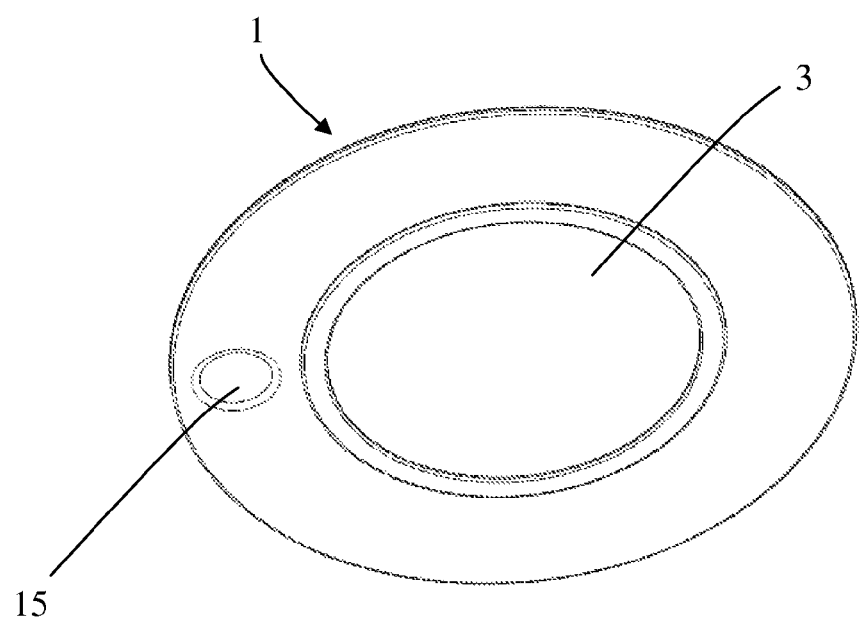
FIG. 12 is a perspective bottom view of a cover according to the embodiment of the FIG. 4.
Figure 13:
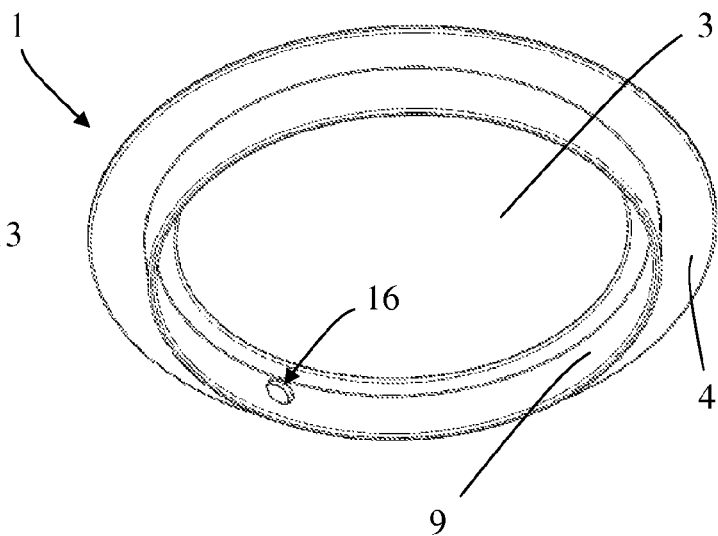
FIG. 13 is a perspective bottom view of a cover according to the embodiment of FIG. 5.
Figure 14:
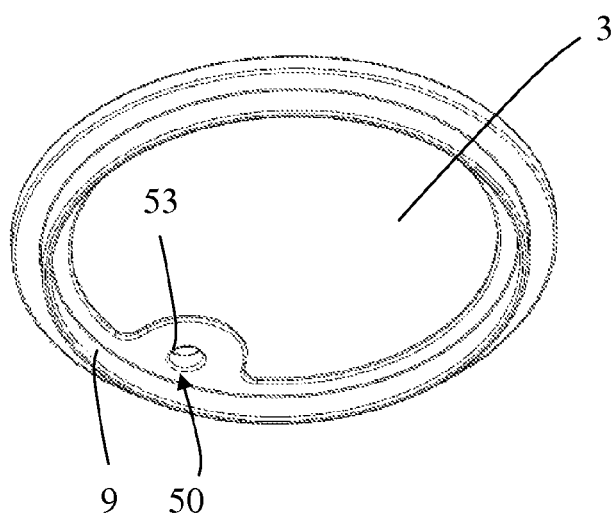
FIG. 14 is a perspective bottom view of a cover according to the embodiment of FIGS. 8.
Figure 15:
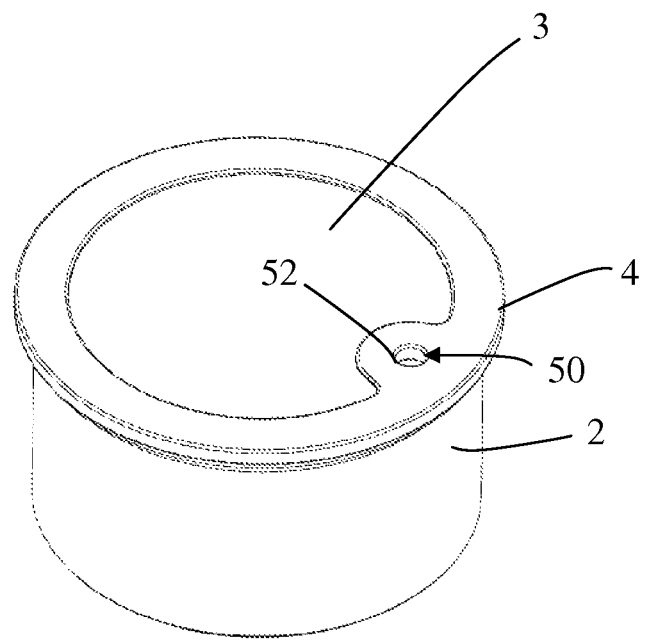
FIG. 15 is a perspective top view of a cover according to the embodiment of FIG. 8, with the cover resting on a culinary article.

In the embodiment illustrated in FIG. 8, at least one passage way 50 (in this case one) is made in a covering portion 5 of the gasket 4. The passage way 50 is the extension of an opening 51 made in the lid 3, and it emerges from two ports 52, 53 that are disposed on either side of the lid 3 so as to enable the steam to be exhausted. Moreover, in this embodiment, the gasket 4 comprises a tubular wall 54 (in this case solid) joining together both ports 52, 53 by going through the opening 51 made in the lid 3, so as to form the steam discharging opening. This tubular wall 54, by encapsulating the opening 51, enables the defects due to the drilling of the lid 3 (in particular when it is made of glass) to be masked. Moreover, this tubular wall 54 which is integral (and single piece) with the silicone gasket 4 also makes a further mechanical attaching element of the silicone gasket to the lid, in particular when the latter is of glass.

The present invention is not limited to the embodiments illustrated in the figures.

On the other hand, it could be possible for the gasket to comprise a steam discharging opening associated with a flexible flap carried by the gasket (preferably single piece) movable between an opening position in which it uncovers the passage way and a closing position in which it obstructs it. For practical reasons, such valve could be made by carrying out a drilling only on an angular sector of around one half-turn.

It would also be possible to make a gripping device overmoulded in the silicone gasket.

Using a gasket in compliance with the present invention also enables two covering members (half lids) of different materials (for example of glass and of stainless steel) to be supported, with the cover not including any link.

Figure 9:
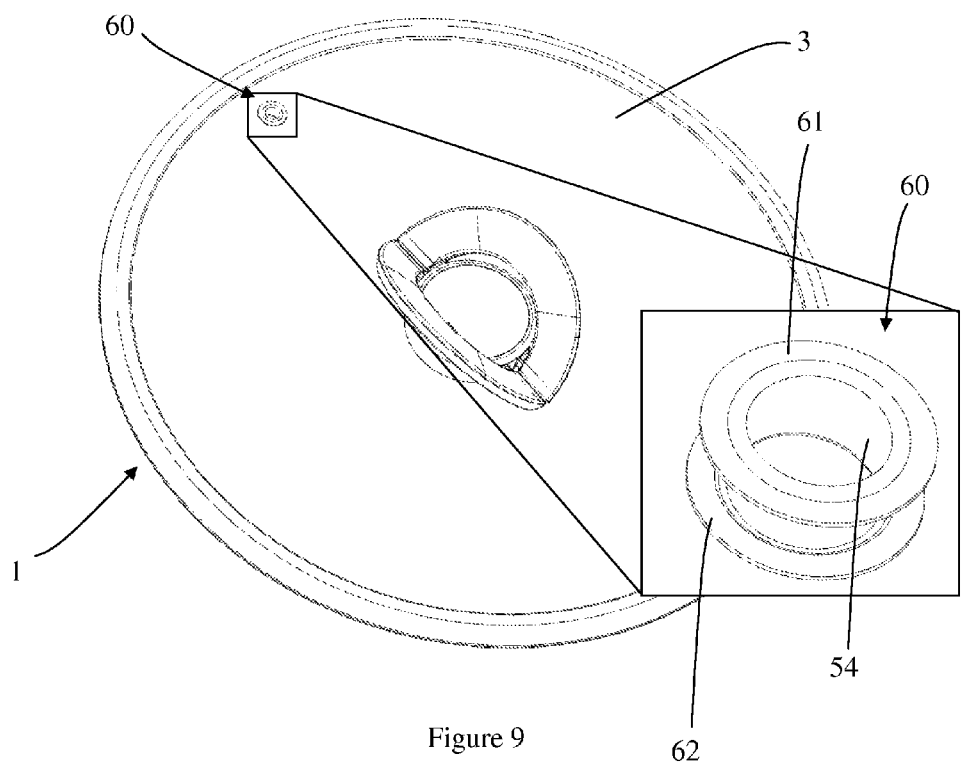
FIG. 9 is a perspective view of a cover according to an eighth embodiment of the present invention.

It would also be possible to have, regardless of the silicone gasket, as it can be seen in FIG. 9, a silicone rivet 62 used in the same way as the tubular wall 54, and associated with an opening made in the lid 3 to discharge steam. This rivet 60 enables the defects due to the drilling of the lid 3 to be masked. The rivet 60 further includes the tubular wall encapsulating the opening 51, two lateral walls 61, 62 disposed on either side of the lid 3, improving its fastening to the lid 3. Such a silicone rivet could be used independently, or be integrated to any type of gasket, and in particular, be integral with a silicone gasket, whether this gasket extends at least 10 mm beyond the perimeter of the lid or not, or whether it has or not one of the characteristics set out in relation with the above described embodiments.

What is claimed is:

1. An assembly of a culinary article having an inner diameter, and a cover, said cover comprising a lid having an outer diameter smaller than the inner diameter of said culinary article and designed to cover the culinary article, and a silicone gasket running around the lid, wherein, in the radial direction, the gasket extends at least 10 mm beyond a perimeter of the lid, the lid and the silicone gasket are two distinct parts of the cover and made of two different materials, the lid has a first face to be directed towards an interior of the culinary article and a second face opposite to the first face, both extending up to an edge of the lid, the silicone gasket is moulded on the lid, so that said silicone gasket extends over said edge and a portion of said first and second faces, and, at least one passage is provided through the silicone gasket, said at least one passage defining a through hole for allowing steam to be exhausted therethrough the culinary article.

2. The assembly according to claim 1, wherein the gasket comprises centering means for centering the cover onto the culinary article on which is disposed said cover.

3. The assembly according to claim 2, wherein, in a radial direction, the centering means extend beyond the perimeter of the lid.

4. The assembly according to claim 2, wherein the gasket comprises centering means on both sides of the cover.

5. The assembly according to claim 2, wherein the centering means are formed by the peripheral rim of the gasket.

6. The assembly according to claim 2, wherein the centering means are formed by falling walls carried by the gasket.

7. The assembly according to claim 1, wherein said at least one passage way is provided in a covering portion of the gasket that radially extends to the perimeter of the lid, the passage way is an extension of an opening provided in the lid, and it emerges from two ports that are disposed on either side of the lid so as to enable steam to be exhausted.

8. The assembly according to claim 1, wherein the gasket comprises a solid tubular wall joining together both ports by going through the opening provided in the lid, so as to form the opening for the exhausting steam.

9. The assembly according to any of claims 1, 7 or 8, wherein at least one passage way is provided in an extending portion of the gasket that radially extends beyond the perimeter of the lid.

10. The assembly according to claim 9, wherein at least one passage way is formed by a clearance provided in the extending portion that radially enters more inside than the centering means so as to enable steam to be exhausted.

11. The assembly according to claim 9, wherein at least one passage way is formed by a port provided in the extending portion, radially more inside than the centering means, so as to enable steam to be exhausted.

12. The assembly according to claim 6, wherein said at least one passage way is formed by a port provided in a falling wall.

13. The assembly according to claim 1, wherein the gasket comprises a flexible flap associated with a passage way enabling the steam to be exhausted and movable between an open position in which it uncovers the passage way and a closing position in which it obstructs it.

14. The assembly according to claim 1, wherein it comprises gripping members carried by the gasket.

15. The assembly according to claim 14, wherein the gripping members are provided in the thickness of the gasket.

16. The assembly according to claim 1, wherein the lid comprises an articulation that axially extends, on both sides, to the gasket.

17. The assembly according to claim 1 wherein said gasket extends to at least 15 mm beyond the perimeter of the lid.

18. The assembly according to claim 1 wherein the silicon gasket is overmoulded around the lid.

19. The assembly according to claim 14, wherein the gripping members is formed by a handle integral with the gasket.

20. An assembly of a culinary article having an inner diameter, and a cover, said cover comprising a lid having an outer diameter smaller than the inner diameter of said culinary article and designed to cover the culinary article,, and a silicone gasket running around the lid, wherein, in the radial direction, the gasket extends at least 10 mm beyond a perimeter of the lid, the lid and the silicone gasket are two distinct parts of the cover and made of two different materials, the lid has a first face to be directed towards an interior of the culinary article and a second face opposite to the first face, both extending up to an edge of the lid, the silicone gasket is moulded on the lid, so that said silicone gasket extends over said edge and a portion of said first and second faces, and, at least one passage is defined between the silicone gasket and the culinary article, said at least one passage defining a through hole allowing steam to be exhausted therethrough from the culinary article.

21. The assembly according to claim 20, wherein said at least one passage way is formed by a boss provided on the cover.

* * * * *